US010684486B2

(12) United States Patent
Wei

(10) Patent No.: US 10,684,486 B2
(45) Date of Patent: Jun. 16, 2020

(54) HEAD UP DISPLAY DEVICE AND CONTROL METHOD THEREOF

(71) Applicant: BOE TECHNOLOGY GROUP CO., LTD., Beijing (CN)

(72) Inventor: Wei Wei, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/742,472

(22) PCT Filed: Jul. 12, 2017

(86) PCT No.: PCT/CN2017/092616
§ 371 (c)(1),
(2) Date: Mar. 13, 2019

(87) PCT Pub. No.: WO2018/032912
PCT Pub. Date: Feb. 22, 2018

(65) Prior Publication Data
US 2019/0204607 A1    Jul. 4, 2019

(30) Foreign Application Priority Data

Aug. 19, 2016  (CN) .......................... 2016 1 0697247

(51) Int. Cl.
*G02B 27/01* (2006.01)
*G02F 1/1347* (2006.01)
(Continued)

(52) U.S. Cl.
CPC ......... *G02B 27/0179* (2013.01); *G02B 27/01* (2013.01); *G02B 27/0101* (2013.01);
(Continued)

(58) Field of Classification Search
None
See application file for complete search history.

(56) References Cited

U.S. PATENT DOCUMENTS 5,200,844 A * 4/1993 Suvada ................. G02B 27/01
345/9
2012/0127381 A1* 5/2012 Lvovskiy ........... G02B 27/0101
349/11
(Continued)

FOREIGN PATENT DOCUMENTS

CN  102221763 A  10/2011
CN  103592772 A  2/2014
(Continued)

OTHER PUBLICATIONS

International Search Report received for PCT Patent Application No. PCT/CN2017/092616, dated Oct. 12, 2017, 6 pages (2 pages of English Translation and 4 pages of Original Document).
(Continued)

*Primary Examiner* — Ryan Crockett
(74) *Attorney, Agent, or Firm* — Womble Bond Dickinson (US) LLP

(57) ABSTRACT

The present disclosure relates to a head up display device and a control method thereof. According to an embodiment of the present disclosure, the head up display device comprises: a display panel; a curved mirror at a light emergent side of the display panel; and a first liquid crystal cell between the display panel and the curved mirror. Specifically, a light incident surface of the curved mirror faces towards the light emergent side of the display panel, and the curved mirror protrudes in a direction facing away from the light emergent side of the display panel. Besides, the first liquid crystal cell is further configured to form at least one optical lens when a first voltage is applied, such that a distance of an image formed by light emitted from the curved mirror relative to the display panel varies with the first voltage.

20 Claims, 4 Drawing Sheets

(51) Int. Cl.
*G02F 1/13* (2006.01)
*G02F 1/29* (2006.01)

(52) U.S. Cl.
CPC .............. *G02F 1/13* (2013.01); *G02F 1/1347* (2013.01); *G02F 1/29* (2013.01); *G02B 2027/0123* (2013.01); *G02B 2027/0185* (2013.01); *G02F 2001/294* (2013.01)

(56) References Cited

U.S. PATENT DOCUMENTS

| | | | | |
|---|---|---|---|---|
| 2014/0049706 | A1* | 2/2014 | Park | G02B 27/22 349/15 |
| 2015/0234458 | A1* | 8/2015 | Hsieh | G02B 27/0172 345/156 |
| 2016/0147074 | A1* | 5/2016 | Kobayashi | G02B 3/0006 345/7 |
| 2016/0363781 | A1* | 12/2016 | Wu | G02F 1/133377 |
| 2019/0051233 | A1* | 2/2019 | Kweon | G09G 3/32 |
| 2019/0243134 | A1* | 8/2019 | Perreault | G02B 26/08 |

FOREIGN PATENT DOCUMENTS

| | | |
|---|---|---|
| CN | 104076572 A | 10/2014 |
| CN | 104407438 A | 3/2015 |
| CN | 104714351 A | 6/2015 |
| CN | 104865702 A | 8/2015 |
| CN | 105334691 A | 2/2016 |
| CN | 106154554 A | 11/2016 |
| CN | 206057682 U | 3/2017 |
| TW | 201600886 A | 1/2016 |

OTHER PUBLICATIONS

Office Action received for Chinese Patent Application No. 201610697247.2, dated Mar. 7, 2018, 12 pages (6 pages of English Translation and 6 pages of Office Action).

* cited by examiner

HEAD UP DISPLAY DEVICE AND CONTROL METHOD THEREOF

The present application is the U.S. national phase entry of PCT/CN2017/092616, with an international filling date of Jul. 12, 2017, which claims the priority of the Chinese patent application No. 201610697247.2 filed on Aug. 19, 2016, disclosures of both are incorporated herein by reference.

TECHNICAL FIELD

The present disclosure relates to the field of display technologies, and in particular to a head up display device and a control method thereof.

BACKGROUND ART

A head up display (HUD) is a device that projects by means of optical reflection related information in front of a user, so as to allow the user to view images with his/her head up. Usually, an imaging position is in front of the user's eyes, and a height is basically flush with the user's eyes. Besides, the projected texts and images are adjusted onto an infinite focal distance, such that the user can easily integrate an ambient view with the related information when he/she looks at the front.

At present, after the HUD is fixed, an optical distance of each optical component therein is determined, and thus, the imaging position is also fixed. However, in consideration of scenes in which the HUD is applied, for example, when prompts are given with respect to the traffic conditions or the velocity during driving an automobile, if an object is present in front at the imaging position, it will inevitably prevent the user from viewing the information presented by the HUD, thus bringing inconvenience to the user and impairing the user experience.

SUMMARY

According to an aspect of the present disclosure, a head up display device is provided, comprising: a display panel; a curved mirror at a light emergent side of the display panel; and a first liquid crystal cell between the display panel and the curved mirror. Specifically, a light incident surface of the curved mirror faces towards the light emergent side of the display panel, and the curved mirror protrudes in a direction facing away from the light emergent side of the display panel. Besides, the first liquid crystal cell is further configured to form at least one optical lens when a first voltage is applied, such that a distance of an image formed by light emitted from the curved mirror relative to the display panel varies with the first voltage.

Optionally, the head up display device according to an embodiment of the present disclosure further comprises: a second liquid crystal cell between the display panel and the first liquid crystal cell or between the first liquid crystal cell and the curved mirror. Specifically, the second liquid crystal cell is configured to form a concave lens or a convex lens when a second voltage is applied, such that a size of an image formed by light emitted from the curved mirror varies with the second voltage.

Optionally, according to an embodiment of the present disclosure, the second liquid crystal cell is further configured to form a Fresnel lens when the second voltage is applied.

Optionally, according to an embodiment of the present disclosure, the first liquid crystal cell specifically comprises: two first transparent substrates facing towards each other; a first liquid crystal layer sandwiched between the two first transparent substrates; and two first transparent conductive layers on respective sides (i.e., inner sides) of the two first transparent substrates facing towards the first liquid crystal layer.

Optionally, the first liquid crystal cell forms a plurality of optical lenses when the first voltage is applied, and the plurality of optical lenses correspond to a plurality of image regions of the display panel respectively. Besides, in each optical lens, at least one of the first transparent conductive layers comprises a plurality of non-consecutive patterns.

Optionally, in a specific instance of the above embodiment, each optical lens is connected to a different control terminal.

Optionally, in another instance of the above embodiment, the non-consecutive patterns for the at least one of the first transparent conductive layers comprise one or more rectangles, circles and triangles.

Similar to the first liquid crystal cell, according to an embodiment of the present disclosure, the second liquid crystal cell comprises: two second transparent substrates facing towards each other; a second liquid crystal layer sandwiched between the two second transparent substrates; and two second transparent conductive layers on respective sides (i.e., inner sides) of the two second transparent substrates facing towards the second liquid crystal layer.

Optionally, in a specific instance of the above embodiment, at least one of the second transparent conductive layers comprises a plurality of concentric circles or concentric rectangles. Besides, each concentric circle or concentric rectangle is connected to a different control terminal.

Optionally, in another instance of the above embodiment, distances between adjacent concentric circles or adjacent concentric rectangles are equal.

Optionally, in the head up display device according to an embodiment of the present disclosure, the display panel is a liquid crystal display panel or an OLED display panel.

According to another aspect of the present disclosure, a method for controlling the above described head up display device is provided. Specifically, the method comprises: determining, according to a position of an image to be formed, a distance of the image relative to the display panel in the head up display device; and adjusting, according to the determined distance of the image, the first voltage to be applied to the first liquid crystal cell, such that the distance of the image formed relative to the display panel varies with the first voltage applied.

Optionally, according to another embodiment of the present disclosure, the head up display device further comprises: a second liquid crystal cell between the display panel and the first liquid crystal cell or between the first liquid crystal cell and the curved mirror. Besides, the second liquid crystal cell is further configured to form a concave lens or a convex lens when a second voltage is applied, such that a size of an image formed by light emitted from the curved mirror varies with the second voltage. In such a specific embodiment, the method further comprises: determining, according to the size of the image to be formed, a focal distance of the second liquid crystal cell; and adjusting, according to the determined focal distance, the second voltage to be applied to the second liquid crystal cell, such that the size of the image formed varies with the second voltage applied.

BRIEF DESCRIPTION OF THE DRAWINGS

In order to illustrate technical solutions in the embodiments of the present disclosure more clearly, drawings to be used in depictions of the embodiments will be briefly introduced as follows. Apparently, the drawings in the depictions below are only some embodiments of the present disclosure. For a person having ordinary skills in the art, other suitable embodiments can also be obtained from these embodiments without any inventive efforts. In the drawings.

DETAILED DESCRIPTION OF THE EMBODIMENTS

To render the goal, technical solutions and advantages of the present disclosure clearer, the present disclosure will be described below in detail with reference to the drawings. Apparently, the embodiments described below are only part of the embodiments of the present disclosure, rather than all of them. Based on the embodiments in the present disclosure, all other embodiments obtainable by a person having ordinary skills in the art without any inventive efforts shall fall within the protection scope of the present disclosure.

Embodiments of the present disclosure provide a head up display device and a control method thereof, so as to solve problems such as impairment of the user experience due to a fixed imaging position in an existing head up display device.

Figure 1:
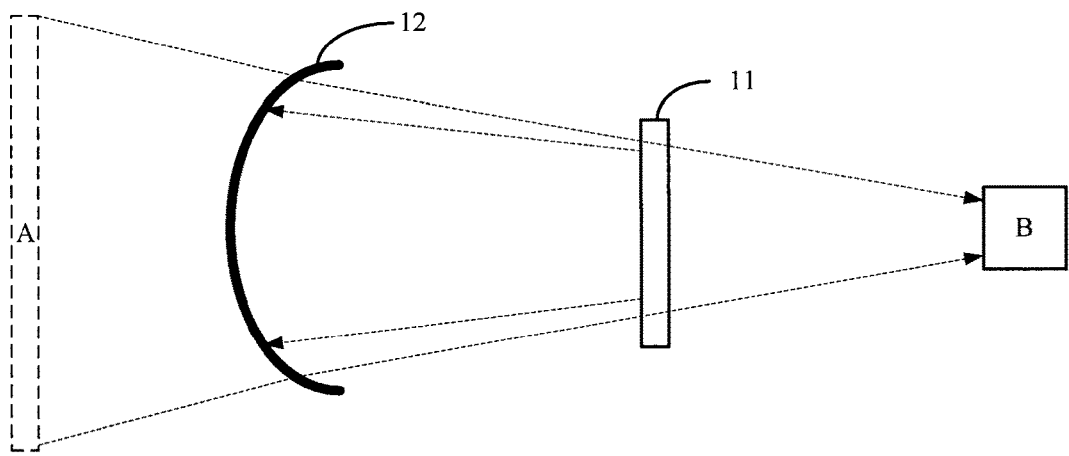
FIG. 1 is a schematic structure view for a relevant head up display device.

Referring to FIG. 1, a schematic structure view for a relevant head up display device (HUD) is shown. The HUD mainly comprises: a display panel 11; and a curved mirror 12 located at a light emergent side of the display panel 11. Specifically, a light incident side of the curved mirror 12 faces towards the light emergent side of the display panel 11, and the curved mirror 12 is recessed at the light incident side. The display panel 11 and the curved mirror 12 are spaced apart by a suitable optical distance, such that light emitted from the display panel 11 (including image information) is imaged at the dashed box A after the curved mirror 12. Then, such light is captured by the user's eyes located at window B, and thereby the goal of head up display is achieved. As can be seen, in a head up display device comprising only the display panel 11 and the curved mirror 12, the imaging position is fixed, and thus the user experience can be easily impaired.

Figure 2:
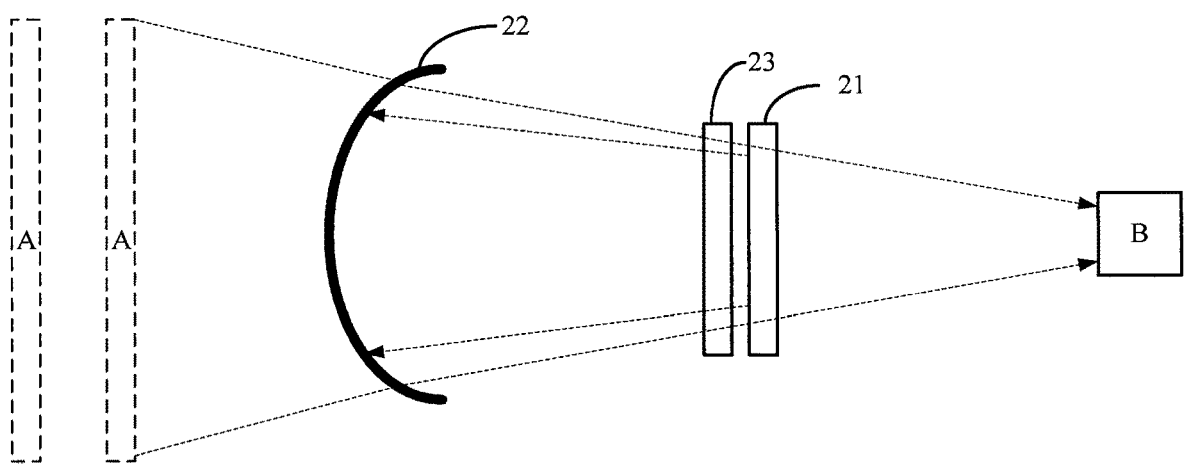
FIG. 2 is a schematic structure view for a head up display device according to an embodiment of the present disclosure.

In view of above, according to an embodiment of the present disclosure, a head up display device is provided. Specifically, referring to FIG. 2, a schematic structure view for a head up display device according to an embodiment of the present disclosure is shown. In FIG. 2, the head up display device mainly comprises: a display panel 21; a curved mirror 22 arranged at a light emergent side of the display panel 21; and a first liquid crystal cell 23 located between the display panel 21 and the curved mirror 22. Specifically, a light incident side of the curved mirror 22 faces towards the light emergent side of the display panel 21, and the curved mirror 22 is recessed at the light incident side. Besides, the first liquid crystal cell 23 is further configured to form at least one optical lens when a first voltage is applied, such that a distance of an image formed by light emitted from the curved mirror 22 relative to the display panel 21 varies with the first voltage applied.

In this technical solution, a first liquid crystal cell is added between the display panel and the curved mirror of the head up display device. In addition, such a first liquid crystal cell comprises two first transparent conductive layers, and at least one of the first transparent conductive layers is patterned. In this case, by applying a corresponding first voltage to the first liquid crystal cell, the first liquid crystal cell can be functionally equivalent to at least one optical lens. Accordingly, the imaging position of the image passing through the display panel can be adjusted flexibly. In particular, if the first liquid crystal cell can be equivalent to a plurality of optical lenses, multilayered display of the image can be further achieved, and thereby, the user experience can be improved.

Figure 3:
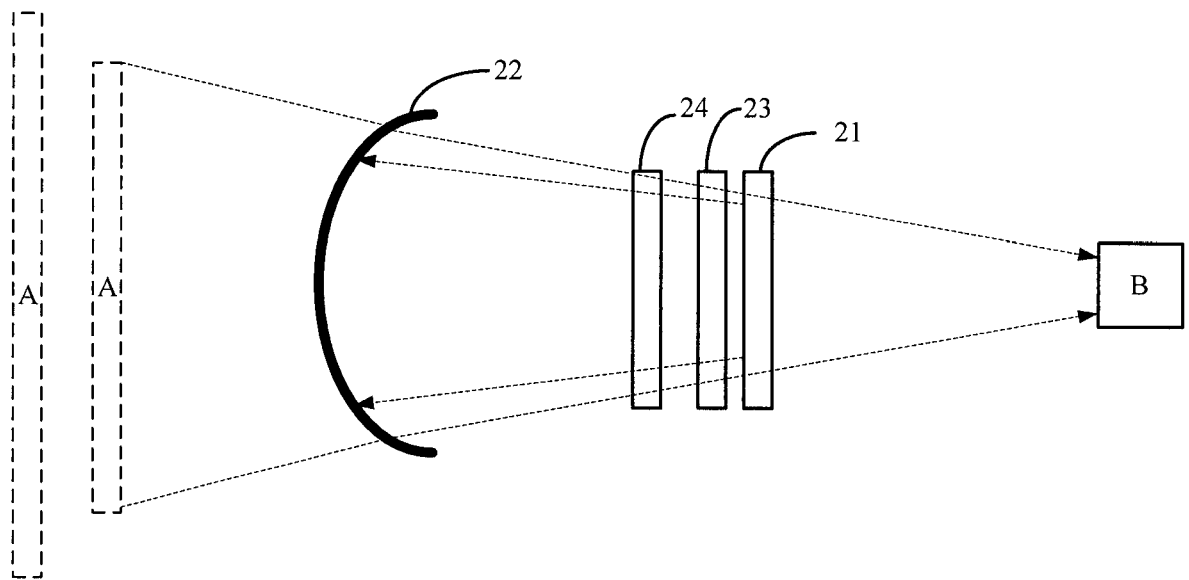
FIG. 3 is a schematic structure view for a head up display device according to another embodiment of the present disclosure.

Furthermore, referring to FIG. 3, the head up display device can further comprise: a second liquid crystal cell 24 located between the display panel 21 and the first liquid crystal cell 23 or between the first liquid crystal cell 23 and the curved mirror 22. Specifically, the second liquid crystal cell 24 can be equivalent to a concave lens or a convex lens when a second voltage is applied. Accordingly, a size of an image formed by light emitted from the curved mirror 22 will vary with the second voltage applied to the second liquid crystal cell 24. As an example, only a case in which the second liquid crystal cell 24 is located between the first liquid crystal cell 23 and the curved mirror 22 is shown in FIG. 3.

According to this technical solution, apart from the first liquid crystal cell, a second liquid crystal cell is further added, and at least one of the second transparent conductive layers in the second liquid crystal cell is patterned. Accordingly, by applying a corresponding second voltage to the second liquid crystal cell, the second liquid crystal cell can be functionally equivalent to a concave lens or a convex lens. As a result, a flexible diffusion or convergence of light can be achieved, and the image can be varied in size.

It should be noted that, since the first liquid crystal cell and the second liquid crystal cell can be both functionally equivalent to a lens, optical distances between the optical components (the display panel, the first liquid crystal cell, the second liquid crystal cell, the curved mirror, and so on) in the head up display device can be adjusted upon actual needs of imaging.

Figure 4:
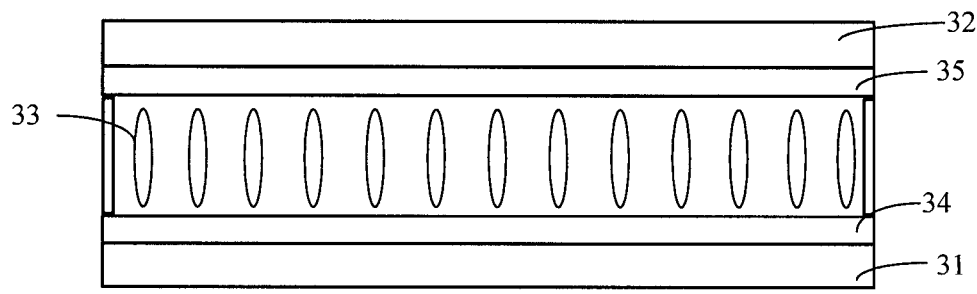
FIG. 4 is a schematic sectional structure view for a first liquid crystal cell or a second liquid crystal cell in the head up display device according to an embodiment of the present disclosure.

Optionally, referring to FIG. 4, the first liquid crystal cell specifically comprises: two first transparent substrates 31, 32 facing towards each other; a first liquid crystal layer 33 sandwiched between the two first transparent substrates 31, 32; and two first transparent conductive layers 34, 45 arranged on respective inner sides of the two first transparent substrates 31, 32. Similarly, the second liquid crystal cell can specifically comprise: two second transparent substrates facing towards each other; a second liquid crystal layer sandwiched between the two second transparent substrates;

and two second transparent conductive layers arranged on respective inner sides of the two second transparent substrates.

Optionally, in an embodiment of the present disclosure, the first liquid crystal cell can be equivalent to an optical lens. That is, the two first transparent substrates of the first liquid crystal cell are both provided with a first transparent conductive layer formed over the entire surface. Accordingly, by adjusting the first voltage applied to the first liquid crystal cell, liquid crystal molecules therein can be deflected, and an optical path difference of light passing through the first liquid crystal cell can be varied. Thereby, the imaging distance can be adjusted.

Furthermore, the first liquid crystal cell can be further equivalent to a plurality of optical lenses, and the plurality of optical lenses correspond to a plurality of image regions of the display panel respectively. Specifically, in each optical lens, at least one of the first transparent conductive layers comprises a plurality of non-consecutive patterns.

As an example, in an embodiment of the present disclosure, the first transparent conductive layers or the second transparent conductive layers involved can specifically be indium tin oxide (ITO).

Specifically, in the first liquid crystal cell, the first transparent conductive layers on the two first transparent substrates may have three specific structures as follows, which are only illustrated below exemplarily.

Figure 5A:
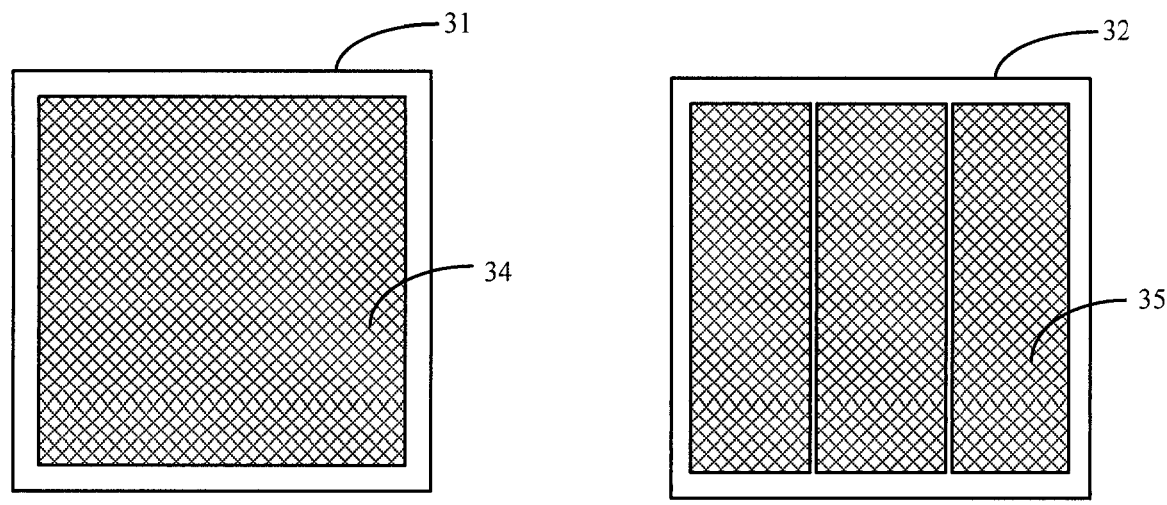
FIG. 5(a)-5(c) are respectively schematic structure views for transparent conductive layers on two transparent substrates in the first liquid crystal cell according to an embodiment of the present disclosure.

Referring to FIG. 5(a), a first type of structure is shown. Specifically, in FIG. 5(a), the structure for one 31 of the first transparent substrates close to the display panel is shown on the left, and the structure for the other 32 of the first transparent substrates remote from the display panel is shown on the right. In the drawing, one 34 of the first transparent conductive layers arranged on the first transparent substrate 31 is ITO formed over the entire surface, and the other 35 of the first transparent conductive layers arranged on the first transparent substrate 32 is patterned ITO. Moreover, the first transparent conductive layer 35 further comprises three non-consecutive rectangular electrode blocks arranged transversally.

Figure 5B:
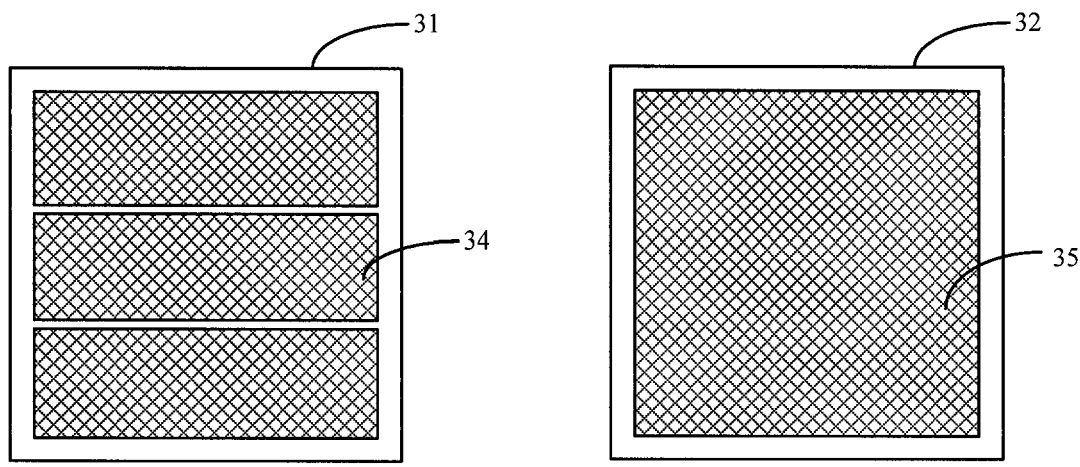

Referring to FIG. 5(b), a second type of structure is shown. Similar to the case in FIG. 5(a), the structure for one 31 of the first transparent substrates close to the display panel is shown on the left, and the structure for the other 32 of the first transparent substrates remote from the display panel is shown on the right. However, what's different from FIG. 5(a) is that one 34 of the first transparent conductive layers arranged on the first transparent substrate 31 is patterned ITO, and the first transparent conductive layer 35 arranged on the other 32 of the first transparent substrates is ITO formed over the entire surface. Moreover, the first transparent conductive layer 34 further comprises three non-consecutive rectangular electrode blocks arranged longitudinally.

Figure 5C:
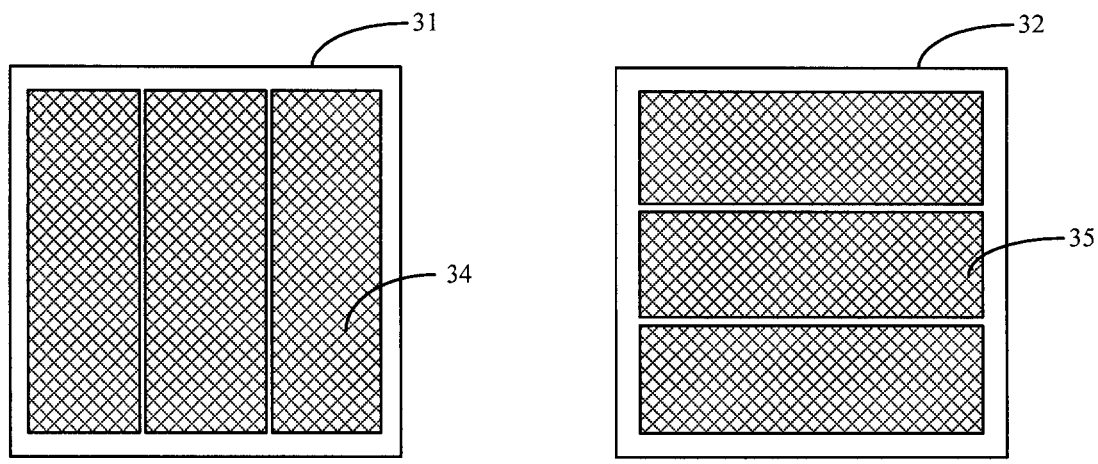

Referring to FIG. 5(c), a third type of structure is shown. Specifically, the structure for one 31 of the first transparent substrates close to the display panel is shown on the left, and the structure for the other 32 of the first transparent substrates remote from the display panel is shown on the right. Now, one 34 of the first transparent conductive layers arranged on the first transparent substrate 31 is patterned ITO, and the first transparent conductive layer 34 comprises three non-consecutive rectangular electrode blocks arranged transversally. Besides, one 35 of the first transparent conductive layers arranged on the first transparent substrate 32 is also patterned ITO, and the first transparent conductive layer 35 comprises three non-consecutive rectangular electrode blocks arranged longitudinally.

In fact, the above three kinds of structures are only provided for illustrating on which transparent substrate the patterned transparent conductive layer can be arranged specifically. In consideration of the influence of applied voltages on the display panel, the structure of FIG. 5(a) is advantageous.

Moreover, it should be noted that the structure in FIG. 5(c) is only a schematic example, and the solution can also render the first liquid crystal layer to be equivalent to a plurality of optical lenses. However, in this case, the number of optical lenses will be determined jointly by the patterns of transparent conductive layers on the two transparent substrates. In contrast, in the other two types of structures, the number of optical lenses will be determined by the pattern of one transparent conductive layer.

It should be noted that in the above structures for the first liquid crystal cell, the number of optical lenses that the first liquid crystal cells can be equivalent to is not limited, and can be specifically selected according to image sections on the display panel. If the display panel is divided into an image 1 showing information of the traffic conditions, an image 2 showing the velocity of automobile in the front, and an image 3 showing the road in the front, the selected first liquid crystal cell can be equivalent to three optical lenses.

Optionally, in an embodiment of the present disclosure, each optical lens of the first liquid crystal cell is connected to a different control terminal respectively. Specifically, for the first transparent conductive layer having regular patterns, the electrode blocks in the patterned first transparent conductive layer can be connected to different voltages, so as to improve the flexibility in achieving equivalent optical lenses. This will be illustrated in detail by examples as follows.

As an example, as shown by the structures in FIG. 5(a) and FIG. 5(b), voltages applied to the electrode blocks in the patterned first transparent conductive layers can be controlled. Specifically, when a same voltage is applied to three electrode blocks, positions of the image regions in the display panel corresponding to the three electrode blocks will be the same after imaging. Obviously, different voltages can be applied to the three electrode blocks, thereby achieving multilayered display.

In another example, as shown by the structure in FIG. 5(c), the electrode blocks in the two patterned first transparent conductive layers are arranged to intersect each other. Therefore, nine lenses can be formed according to the arrangement of electrode blocks in FIG. 5(c). In other words, an imaging solution of nine different layers can be achieved, as long as different voltages are applied to the electrode blocks. As can be seen, with this structure, multilayered display can be achieved only by suitably adjusting the voltages applied to the electrode blocks, which is more flexible.

It should be noted that the above embodiments of the present disclosure are all described by taking rectangles as an example. However, the pattern shape of first transparent conductive layer in the first liquid crystal cell can also be circular or triangular. In addition, in a transparent conductive layer, the pattern can further be rectangles, or circles, or triangles, either singly or in a combined manner.

Optionally, in an embodiment of the present disclosure, the second liquid crystal cell can be equivalent to a Fresnel lens when the second voltage is applied, such that the image can be adjusted in size more effectively.

Optionally, in the second liquid crystal cell, the pattern for at least one of the second transparent conductive layers can be a plurality of concentric circles or concentric rectangles. Besides, each concentric circle or concentric rectangle is connected to a different control terminal.

Figure 6A:
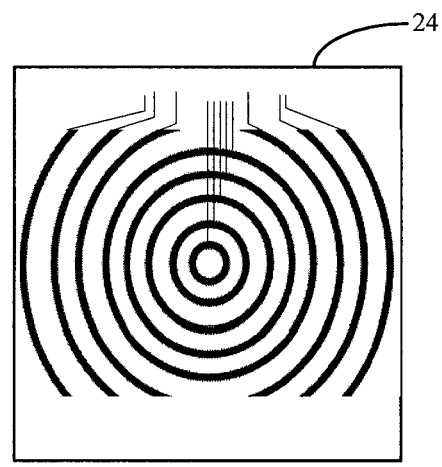
FIG. 6(a)-6(b) are respectively schematic structure views for the patterns of transparent conductive layers in the second liquid crystal cell according to an embodiment of the present disclosure.
Figure 6B:
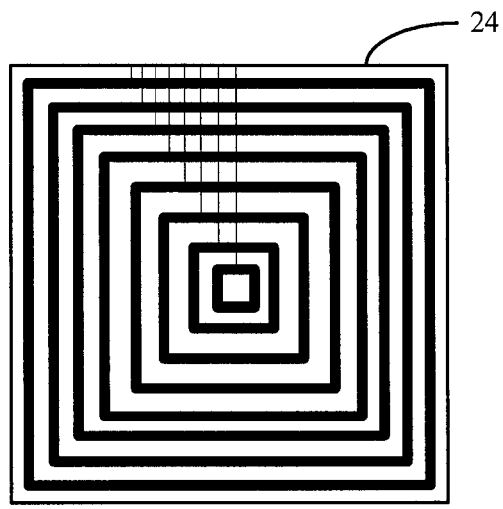

Specifically, similar to the first liquid crystal cell, the second liquid crystal cell can comprise either one of the second transparent substrates having a patterned second transparent conductive layer, or two of the second transparent substrates both having a patterned second transparent conductive layer. However, patterns of the second transparent conductive layers on the two second transparent substrates correspond to each other as much as possible. Specifically, as shown in FIG. 6(a), in the second liquid crystal cell 24, any of the second transparent conductive layers can comprise a plurality of concentric circles. Now, in consideration of the fact that the liquid crystal cell is rectangular, the concentric circle having a greater radius is not complete. However, each concentric circle must be connected to a corresponding control terminal, such that a corresponding voltage can be applied to achieve a Fresnel mode. Alternatively, as shown in FIG. 6(b), in the second liquid crystal cell 24, any of the second transparent conductive layers can comprise a plurality of concentric rectangles. Specifically, the dimension of each rectangle can be designed according to the size of the transparent substrates. Besides, each concentric rectangle is connected to a corresponding control terminal, such that a voltage can be applied to achieve a Fresnel mode. In other words, by applying different voltages at different positions of the second liquid crystal cell, the second liquid crystal cell can be functionally equivalent to a concave lens or a convex lens, and thereby a light diffusion or convergence effect can be achieved.

It should be noted that in an embodiments of the present disclosure, it is unnecessary to define the voltages applied to each concentric circle or concentric rectangle in the second liquid crystal cell, and the voltages can be set based on the size of the image as desired. For example, if light emitted from the display panel has a greater diffusion angle, the second liquid crystal cell can be selected as a convex lens. Specifically, the focal distance can be adjusted according to the magnitude of voltage applied to each concentric circle or concentric rectangle.

Besides, in an embodiment of the present disclosure, in order to reduce the influence on the display panel exerted by the voltages applied to the patterns of transparent conductive layers, the transparent substrate having patterned transparent conductive layers can be arranged at a side remote from the display panel, and the transparent substrate having non-patterned transparent conductive layers can be arranged at a side close to the display panel. Moreover, the premise of such an arrangement is that one transparent substrate is not provided with patterns of transparent conductive layer.

Optionally, in order to ensure homogeneity of the concave lens or the convex lens formed by the second liquid crystal cell, distances between adjacent concentric circles or adjacent concentric rectangles are equal.

Optionally, in an embodiment of the present disclosure, the display panel involved in the above solution is a liquid crystal display panel or an OLED display panel. It should be noted that the liquid crystal display device is a passive light emitting device, and a backlight source is needed for providing backlight. Therefore, the liquid crystal display panel is a panel device comprising a backlight source. In contrast, the OLED display panel is an active light emitting device, so no backlight source is needed. However, as the emergent light needs to enter the first liquid crystal cell subsequently, it is usually necessary to further arrange a polarizer at the light emergent side of the OLED display panel, so as to satisfy the need that light entering the first liquid crystal cell is polarized light.

Figure 7A:
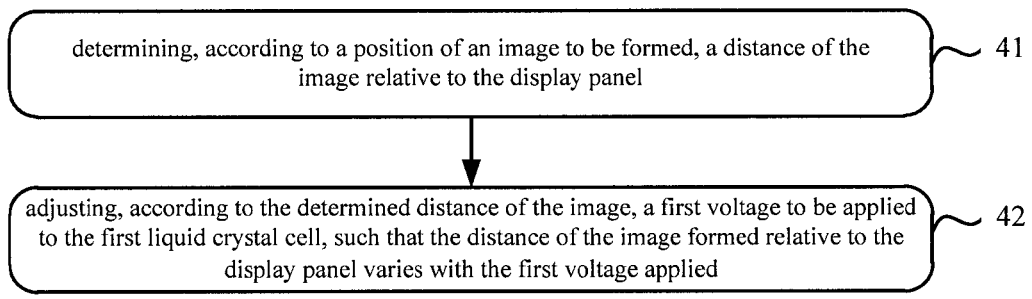
FIG. 7(a)-7(b) are respectively flow diagrams of a method for controlling the head up display device according to an embodiment of the present disclosure.

At the same time, an embodiment of the present disclosure further provides a method for controlling a head up display device. As shown in FIG. 7(a), the method mainly comprises steps as follows.

In step 41, a distance of the image relative to the display panel is determined according to a position of an image to be formed, .

Specifically, after the position of the image to be formed is determined, a desired image distance can be calculated according to an imaging formula based on the optical distances between various optical components in the head up display device.

In step 42, a first voltage to be applied to the first liquid crystal cell is adjusted, according to the determined distance of the image, such that the distance of the image formed relative to the display panel varies with the first voltage applied.

Specifically, after the image distance is determined, a desired optical path can be calculated according to the imaging formula, and in turn an optical path difference of light passing through the first liquid crystal cell can be determined. After the optical path difference is determined, a refractive index of the current first liquid crystal cell is determined by using a formula of optical path difference, and the first voltage to be applied is determined based on the refractive index. Generally, tests can be made in advance by using a liquid crystal cell to obtain a table for refractive indexes of the liquid crystal cell under different voltages, so as to facilitate subsequent lookup and use.

It should be noted that when the first liquid crystal cell can be equivalent to a plurality of optical lenses, it is necessary to determine for each optical lens a corresponding image distance and adjust the magnitude of the first voltage applied to the optical lens based on the image distance.

Figure 7B:
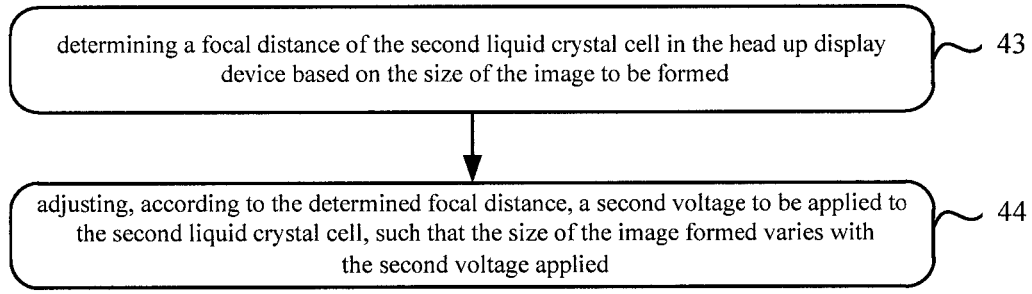

When the head up display device further comprises a second liquid crystal cell, as shown in FIG. 7(b), the control method further comprises steps as follows.

In step 43, a focal distance of the second liquid crystal cell in the head up display device is determined based on the size of the image to be formed.

In step 44, a second voltage to be applied to the second liquid crystal cell is adjusted, according to the determined focal distance, such that the size of the image formed varies with the second voltage applied.

It should be pointed out that in an embodiment of the present disclosure, step 41 and step 42 can be executed before step 43 and step 44. Alternatively, step 43 and step 44 can be executed before step 41 and step 42.

Although certain embodiments of the present disclosure have been described, those skilled in the art can make further variations and modifications to these embodiments once they know the basic inventive concept. Therefore, the appended claims are intended to include the described embodiments as well as all variations and modifications falling within the scope of the present disclosure.

Obviously, those skilled in the art can make various modifications and variations to the present disclosure without departing from the spirit and scope of the present disclosure. Thus, if these modifications and variations to the present disclosure fall within the scope of the claims in the present disclosure and the equivalent techniques thereof, the present disclosure is intended to include them too.

The invention claimed is:

1. A head up display device, comprising:
   a display panel;
   a curved mirror at a light emergent side of the display panel, wherein a light incident surface of the curved mirror faces towards the light emergent side of the display panel, and the curved mirror protrudes in a direction facing away from the light emergent side of the display panel; and
   a first liquid crystal cell between the display panel and the curved mirror, wherein
   the first liquid crystal cell is configured to form at least one optical lens when a first voltage is applied, such that a distance of an image formed by light emitted from the curved mirror relative to the display panel varies with the first voltage,
   wherein the head up display device further comprises a second liquid crystal cell between the display panel and the first liquid crystal cell, the second liquid crystal cell is configured to form a concave lens or a convex lens when a second voltage is applied, such that a size of an image formed by light emitted from the curved mirror varies with the second voltage,
   wherein light entering each of the first liquid crystal cell and the second liquid crystal cell is polarized light.

2. The head up display device according to claim 1, wherein the second liquid crystal cell forms a Fresnel lens when the second voltage is applied.

3. The head up display device according to claim 2, wherein the display panel comprises a liquid crystal display panel or an OLED display panel.

4. The head up display device according to claim 1, wherein the first liquid crystal cell comprises:
   two first transparent substrates facing towards each other;
   a first liquid crystal layer sandwiched between the two first transparent substrates; and
   two first transparent conductive layers on respective sides of the two first transparent substrates facing towards the first liquid crystal layer.

5. The head up display device according to claim 4, wherein
   the first liquid crystal cell forms a plurality of optical lenses when the first voltage is applied, wherein the plurality of optical lenses correspond to a plurality of image regions of the display panel respectively, and in each optical lens, at least one of the first transparent conductive layers comprises a plurality of non-consecutive patterns.

6. The head up display device according to claim 5, wherein
   each optical lens is connected to a different control terminal.

7. The head up display device according to claim 6, wherein the display panel comprises a liquid crystal display panel or an OLED display panel.

8. The head up display device according to claim 5, wherein
   the non-consecutive patterns comprise one or more rectangles, circles and triangles.

9. The head up display device according to claim 5, wherein
   the display panel comprises a liquid crystal display panel or an OLED display panel.

10. The head up display device according to claim 4, wherein the display panel comprises a liquid crystal display panel or an OLED display panel.

11. The head up display device according to claim 1, wherein the second liquid crystal cell comprises:
    two second transparent substrates facing towards each other;
    a second liquid crystal layer sandwiched between the two second transparent substrates; and
    two second transparent conductive layers on respective sides of the two second transparent substrates facing towards the second liquid crystal layer.

12. The head up display device according to claim 11, wherein
    at least one of the second transparent conductive layers comprises a plurality of concentric circles or concentric rectangles, each concentric circle or concentric rectangle is connected to a different control terminal.

13. The head up display device according to claim 12, wherein
    distances between adjacent concentric circles or adjacent concentric rectangles are equal.

14. The head up display device according to claim 1, wherein
    the display panel comprises a liquid crystal display panel or an OLED display panel.

15. A method for controlling the head up display device according to claim 1, comprising:
    determining, according to a position of an image to be formed, a distance of the image relative to the display panel; and
    adjusting, according to the determined distance of the image, a first voltage to be applied to the first liquid crystal cell, such that the distance of the image formed relative to the display panel varies with the first voltage applied.

16. The method according to claim 15, wherein
    the head up display device further comprises: a second liquid crystal cell between the display panel and the first liquid crystal cell or between the first liquid crystal cell and the curved mirror, wherein the second liquid crystal cell is configured to form a concave lens or a convex lens when a second voltage is applied, such that a size of an image formed by light emitted from the curved mirror varies with the second voltage, and
    the method further comprising:
    determining a focal distance of the second liquid crystal cell based on a size of the image to be formed; and
    adjusting, according to the determined focal distance, a second voltage to be applied to the second liquid crystal cell, such that the size of the image formed varies with the second voltage applied.

17. The head up display device according to claim 1, further comprising:
    a second liquid crystal cell between the first liquid crystal cell and the curved mirror, wherein
    the second liquid crystal cell is configured to form a concave lens or a convex lens when a second voltage is applied, such that a size of an image formed by light emitted from the curved mirror varies with the second voltage.

18. The head up display device according to claim 17, wherein the display panel comprises a liquid crystal display panel or an OLED display panel.

19. The head up display device according to claim 1, wherein the display panel comprises a liquid crystal display panel or an OLED display panel.

20. A head up display device, comprising:

a display panel;

a curved mirror at a light emergent side of the display panel, wherein a light incident surface of the curved mirror faces towards the light emergent side of the display panel, and the curved mirror protrudes in a direction facing away from the light emergent side of the display panel; and a first liquid crystal cell between the display panel and the curved mirror, wherein the first liquid crystal cell is configured to form at least one optical lens when a first voltage is applied, such that a distance of an image formed by light emitted from the curved mirror relative to the display panel varies with the first voltage, wherein the head up display device further comprises a second liquid crystal cell between the display panel and the first liquid crystal cell, the second liquid crystal cell is configured to form a concave lens or a convex lens when a second voltage is applied, such that a size of an image formed by light emitted from the curved mirror varies with the second voltage, wherein the second liquid crystal cell comprises:

two second transparent substrates facing towards each other;

a second liquid crystal layer sandwiched between the two second transparent substrates; and two second transparent conductive layers on respective sides of the two second transparent substrates facing towards the second liquid crystal layer, wherein at least one of the second transparent conductive layers comprises a plurality of concentric circles or concentric rectangles, each concentric circle or concentric rectangle is connected to a different control terminal.

* * * * *